US012691924B2

(12) United States Patent
Kawakami et al.

(10) Patent No.: US 12,691,924 B2
(45) Date of Patent: Jul. 28, 2026

(54) ASSESSMENT DEVICE, STORAGE MEDIUM STORING COMPUTER PROGRAM FOR ASSESSMENT, AND ASSESSMENT METHOD FOR DETECTING DRIVER CONTROL OF A STEERING WHEEL THROUGH AUXILIARY CONTROL INPUTS

(71) Applicant: TOYOTA JIDOSHA KABUSHIKI KAISHA, Toyota (JP)

(72) Inventors: Satoru Kawakami, Tokyo-to (JP); Jiro Fujino, Tokyo-to (JP); Shunichiroh Sawai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 17/994,759

(22) Filed: Nov. 28, 2022

(65) Prior Publication Data

US 2023/0174135 A1    Jun. 8, 2023

(30) Foreign Application Priority Data

Dec. 6, 2021    (JP) ................................. 2021-198018

(51) Int. Cl.
| | |
|---|---|
| *B62D 1/04* | (2006.01) |
| *B60K 35/10* | (2024.01) |
| *B60K 35/60* | (2024.01) |
| *B60W 10/10* | (2012.01) |
| *B60K 35/22* | (2024.01) |

(52) U.S. Cl.
CPC .............. *B62D 1/046* (2013.01); *B60K 35/10* (2024.01); *B60K 35/60* (2024.01); *B60W 10/10* (2013.01); *B60K 35/22* (2024.01)

(58) Field of Classification Search
CPC ... B62D 1/046; B60W 10/10; B60W 60/0059; B60K 2360/197; B60K 2360/143; B60K 2360/782; B60K 35/29; B60K 35/10; B60K 35/60; B60K 20/06; F16H 2059/0247
USPC .......................................................... 701/36
See application file for complete search history.

(56) References Cited

U.S. PATENT DOCUMENTS

| | | | | |
|---|---|---|---|---|
| 11,447,146 | B2 * | 9/2022 | Xiang ................... | B60W 50/10 |
| 12,122,429 | B2 * | 10/2024 | Kerschbaum ..... | B60W 60/0054 |
| 2017/0282935 | A1 * | 10/2017 | Fujimoto .............. | B60W 50/08 |
| 2018/0150074 | A1 * | 5/2018 | Hashimoto ....... | B60W 60/0053 |
| 2018/0231976 | A1 * | 8/2018 | Singh ................... | B60W 30/14 |
| 2018/0362043 | A1 * | 12/2018 | Hwang ................ | B62D 15/025 |

(Continued)

FOREIGN PATENT DOCUMENTS

| | | | | |
|---|---|---|---|---|
| EP | 3888991 A1 * | 10/2021 | ............ | B60W 40/08 |
| JP | 2008-273521 A | 11/2008 | | |

(Continued)

OTHER PUBLICATIONS

Steve Corrigan, Introduction to the Controller Area Network, May 2016, Texas Instruments, pp. 1-17.*

*Primary Examiner* — Andrew R Dyer
(74) *Attorney, Agent, or Firm* — Oliff PLC

(57)    ABSTRACT

An assessment device has a processor configured to determine that the driver is in control of the steering wheel when an operation signal from an operating unit that can be operated by a hand of the driver that is holding the steering wheel has been input. The operating unit is configured to input operation information to change the gear ratio of a transmission.

8 Claims, 5 Drawing Sheets

(56)  References Cited

U.S. PATENT DOCUMENTS

| | | | | |
|---|---|---|---|---|
| 2019/0113913 A1* | 4/2019 | Ryne | .................... | B60W 50/087 |
| 2020/0159212 A1* | 5/2020 | Kuwabara | ......... | B60W 60/0053 |
| 2020/0361494 A1* | 11/2020 | Zheng | ...................... | B62D 6/10 |
| 2021/0370985 A1* | 12/2021 | Lee | ................... | B60W 60/0061 |
| 2021/0371000 A1* | 12/2021 | Nozoe | ...................... | G01V 3/06 |
| 2022/0134876 A1* | 5/2022 | Tsukada | ................. | B60K 28/04 |
| | | | | 701/93 |
| 2022/0194294 A1* | 6/2022 | Kim | ......................... | B60Q 9/00 |
| 2022/0355858 A1* | 11/2022 | Pandy | ...................... | B62D 6/10 |
| 2024/0181980 A1* | 6/2024 | Kring | ................... | B60K 35/60 |
| 2024/0246598 A1* | 7/2024 | He | ......................... | B62D 1/046 |
| 2024/0319025 A1* | 9/2024 | Tanaka | .................... | B62D 1/06 |

FOREIGN PATENT DOCUMENTS

| | | | | |
|---|---|---|---|---|
| JP | 6133204 B2 | 5/2017 | | |
| JP | 2017-178009 A | 10/2017 | | |
| JP | 2018-199402 A | 12/2018 | | |
| JP | 2020-032949 A | 3/2020 | | |
| WO | WO-2021111644 A1 * | 6/2021 | ........... | B62D 5/0463 |

* cited by examiner

HOLDING ASSESSMENT
PROCESSING

S201

TOUCH DETECTION
SIGNAL INPUT FROM TOUCH
SENSOR?

Yes

No

S202

OPERATION SIGNAL
INPUT FROM SHIFT OPERATING
UNIT?

No

Yes

S203

DETERMINE THAT DRIVER
IS IN CONTROL OF
STEERING WHEEL

S204

DETERMINE THAT DRIVER
IS NOT IN CONTROL
OF STEERING WHEEL

END

ASSESSMENT DEVICE, STORAGE MEDIUM STORING COMPUTER PROGRAM FOR ASSESSMENT, AND ASSESSMENT METHOD FOR DETECTING DRIVER CONTROL OF A STEERING WHEEL THROUGH AUXILIARY CONTROL INPUTS

FIELD

The present disclosure relates to an assessment device, a storage medium storing a computer program for assessment, and an assessment method.

BACKGROUND

There are certain situations in which an autonomous control system for a vehicle judges that the vehicle cannot be autonomously controlled, or in which driving of the vehicle is switched to the driver in response to a driver request. When driving of the vehicle is to be switched, control of the vehicle is switched to the driver only after having determined that the driver has executed an acknowledgement action.

For example, by law, a level 3 autonomous control system must be able to recognize the following 3 driver acknowledgement actions. (1) Control (Holding) of the steering wheel and operation of the accelerator pedal by the driver, (2) control of the steering wheel and operation of the brake pedal by the driver, (3) control of the steering wheel and operation of the steering wheel by the driver. All of these conditions require recognition that the driver is in control of the steering wheel.

It has been proposed to use touch sensors as the means for detecting that the driver is in control of the steering wheel (see Japanese Unexamined Patent Publication No. 2008-273521, for example). A touch sensor is situated in the rim part of the steering wheel, detecting pressure when the driver is in control, and outputs the detection signal.

SUMMARY

However, if the means for detecting whether the driver is in control of steering is only a touch sensor situated in the steering wheel, any malfunction in the touch sensor can potentially make it impossible to detect that the driver is in control of steering. It is therefore preferred to allow detection of driver control of steering by other means in addition to a touch sensor situated at the rim part of the steering wheel.

It is an object of the present disclosure to provide an assessment device which allows detection of whether a driver is in control of the steering wheel.

According to one embodiment, the invention provides an assessment device. The assessment device has an assessment unit that determines that a driver is in control of a steering wheel when an operation signal from an operating unit that can be operated by a hand of the driver that is holding the steering wheel has been input.

The operating unit in the assessment device is preferably operated by the driver and inputs operation information to change the gear ratio of the transmission.

The operating unit in the assessment device also preferably has a first shift operating unit that is operated by the driver and outputs a first operation signal for a change that increases the gear ratio of the transmission, and a second shift operating unit that is operated by the driver and outputs a second operation signal for a change that decreases the gear ratio of the transmission, and the assessment unit preferably determines that the driver is in control of the steering wheel when the first operation signal has been input from the first shift operating unit and the second operation signal has been input from the second shift operating unit.

In addition, the operating unit in the assessment device is preferably operated by the driver and inputs operation information to operate a display device or audio device.

In this assessment device, the assessment unit preferably determines whether or not an operation signal has been input from the operating unit when the touch detection signal indicating that the driver is gripping the steering wheel has not been input.

According to another embodiment, a non-transitory storage medium storing a computer program for assessment is provided. The computer program for assessment causes a processor execute a process and the process includes determining that a driver is in control of a steering wheel when an operation signal from an operating unit that can be operated by a hand of the driver that is holding the steering wheel has been input.

According to yet another embodiment of the invention there is provided an assessment method. The assessment method is carried out by an assessment device, and the method includes determining that a driver is in control of a steering wheel when an operation signal from an operating unit that can be operated by a hand of the driver that is holding the steering wheel has been input.

Since the assessment device of the disclosure can determine that the driver is holding the steering wheel when an operation signal has been input from the operating unit, it can be determined that the driver is in control of the steering wheel even if the touch sensor of the steering wheel malfunctions.

The object and advantages of the invention will be realized and attained by means of the elements and combinations particularly pointed out in the claims. It is to be understood that both the foregoing general description and the following detailed description are exemplary and explanatory and are not restrictive of the invention, as claimed

DESCRIPTION OF EMBODIMENTS

Figure 1A:
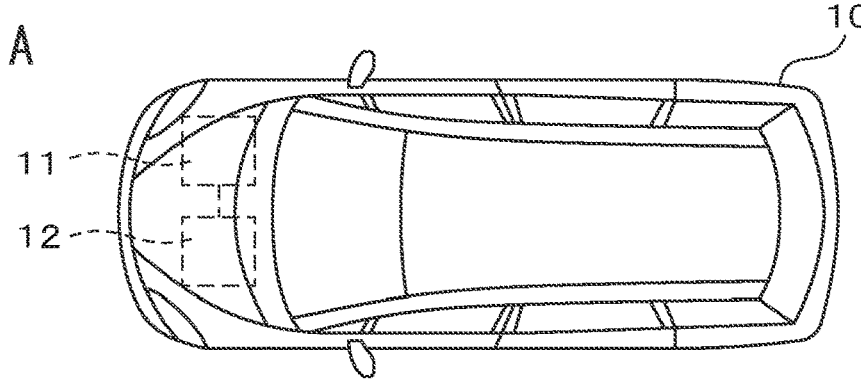
FIG. 1A is a diagram illustrating operation of the assessment device of the embodiment in overview, and showing a vehicle.
Figure 1B:
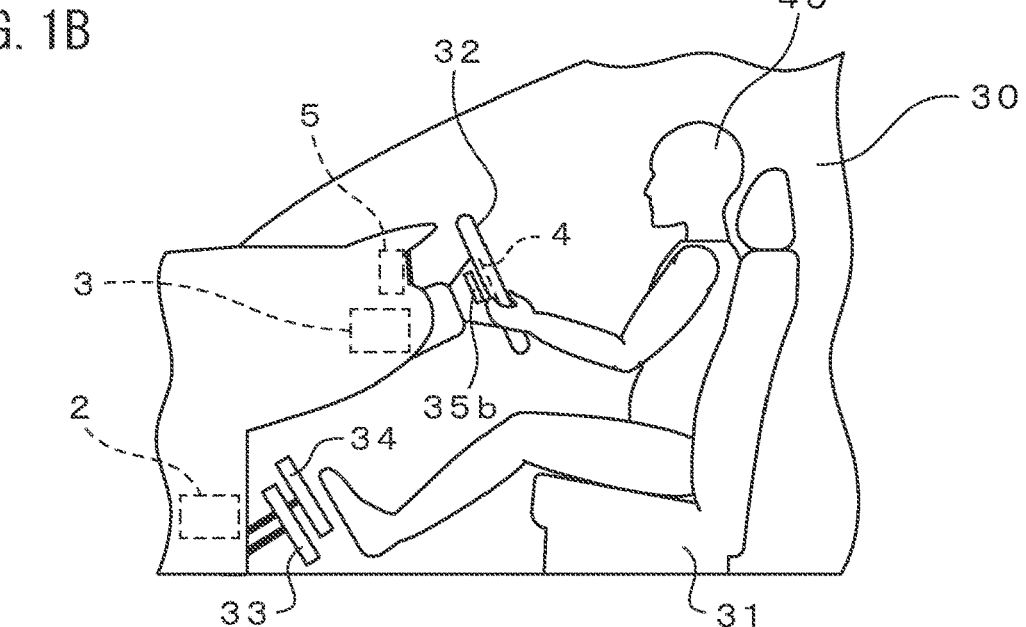
FIG. 1B is a diagram illustrating operation of the assessment device of the embodiment in overview, where the driver is shown in control of the steering wheel.
Figure 1C:
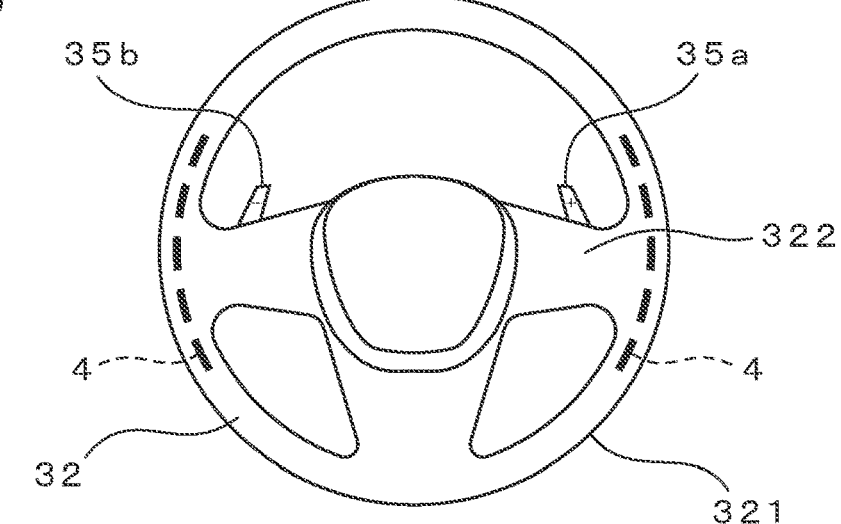
FIG. 1C is a diagram illustrating operation of the assessment device of the embodiment in overview, and showing the steering wheel.

FIG. 1A to 1C are diagrams illustrating operation of the assessment device of the embodiment in overview, where FIG. 1A shows the vehicle, FIG. 1B shows the driver in control of the steering wheel, and FIG. 1C shows the steering wheel.

As shown in FIG. 1A, the vehicle 10 has an autonomous control device 11 and an assessment device 12. The assessment device 12 determines whether the driver 40 has executed an acknowledgement action when the autonomous control device 11 switches driving of the vehicle 10 from autonomous control to manual control.

As shown in FIG. 1B, the driver 40 sits in the driving seat 31 in the cabin 30 in a manner allowing control of the steering wheel 32, brake pedal 33 and accelerator pedal 34.

When it has been determined that driving of the vehicle 10 cannot be safely controlled, the autonomous control device 11 notifies the driver 40 of a control transfer request to switch driving of the vehicle 10 from autonomous control to manual control, via the user interface (UI) 5. Examples of cases where driving of the vehicle 10 cannot be safely controlled include sensor malfunction, insufficient map information, and difficult-to-maneuver terrain (such as abruptly sloping roads or curves with low curvature radii). In such cases, the autonomous control device 11 completes self driving and makes a request for the driver to drive the vehicle 10 by manual control, with advanced driving support.

The driver 40 acknowledges the control transfer request by (1) taking control of the steering wheel 32 and operating the accelerator pedal 34, (2) taking control of the steering wheel 32 and operating the brake pedal 33, or (3) taking control of the steering wheel 32 and operating the steering wheel 32. As used herein, "control" of the steering wheel 32 by the driver 40 includes a state where the driver 40 holds (or grips) the steering wheel 32 or a state where the driver 40 has applied force to the steering wheel 32 for holding and steering the steering wheel 32.

The vehicle 10 has a pedal sensor 2, a steering sensor 3 and a touch sensor 4, to detect an acknowledgement action by the driver 40 in response to a control transfer request.

The pedal sensor 2 detects operation of the brake pedal 33 or accelerator pedal 34 by the driver 40 and outputs a brake pedal detection signal or accelerator pedal detection signal to the assessment device 12. The pedal sensor 2 detects the degree of operation of the brake pedal 33 or accelerator pedal 34 by the driver 40 during manual control of vehicle 10 driving.

The steering sensor 3 detects steering of the steering wheel 32 by the driver 40 and outputs a steering detection signal to the assessment device 12. The steering sensor 3 detects the steering angle and steering force of the steering wheel 32 by the driver 40 during manual control of vehicle 10 driving.

The touch sensor 4 is situated on the rim part 321 of the steering wheel. The touch sensor 4 detects pressure on the rim part 321 when the driver 40 holds the steering wheel 32, and outputs the touch detection signal to the assessment device 12.

The assessment device 12 determines that an acknowledgement action has been executed by the driver 40 when a touch detection signal has been input from the touch sensor

4 and one signal from among the brake pedal detection signal, accelerator pedal detection signal and steering detection signal has been input.

The assessment device 12 notifies the autonomous control device 11 that the control transfer request has been acknowledged. The autonomous control device 11 also switches driving of the vehicle 10 to manual control. The autonomous control device 11 further notifies the driver 40 that the control transfer request has been acknowledged, via the user interface UI 5. It is thus recognized that the driver 40 has acknowledged the control transfer request and driving of the vehicle 10 has been switched to manual control.

A touch detection signal may not be generated, however, due to malfunction of the touch sensor 4. Thus, there will be no notification via the UI 5 that the control transfer request has been acknowledged even if the driver 40 is in control of the steering wheel 32 and has executed at least one operation from among the accelerator pedal 34, brake pedal 33 and steering 32.

The driver 40 therefore operates the shift operating units 35a, 35b for changing of the gear ratio of the transmission, and executes at least one operation from among operation of the accelerator pedal 34, brake pedal 33 and steering 32. The driver 40 is notified beforehand that operation of the shift operating units 35a, 35b is included as being in control of the steering wheel 32, which is an acknowledgement action.

The assessment device 12 determines that an acknowledgement action has been executed by the driver 40 when a shift detection signal has been input from the shift operating units 35a, 35b and one signal from among the brake pedal detection signal, accelerator pedal detection signal and steering detection signal has been input.

Figure 2:
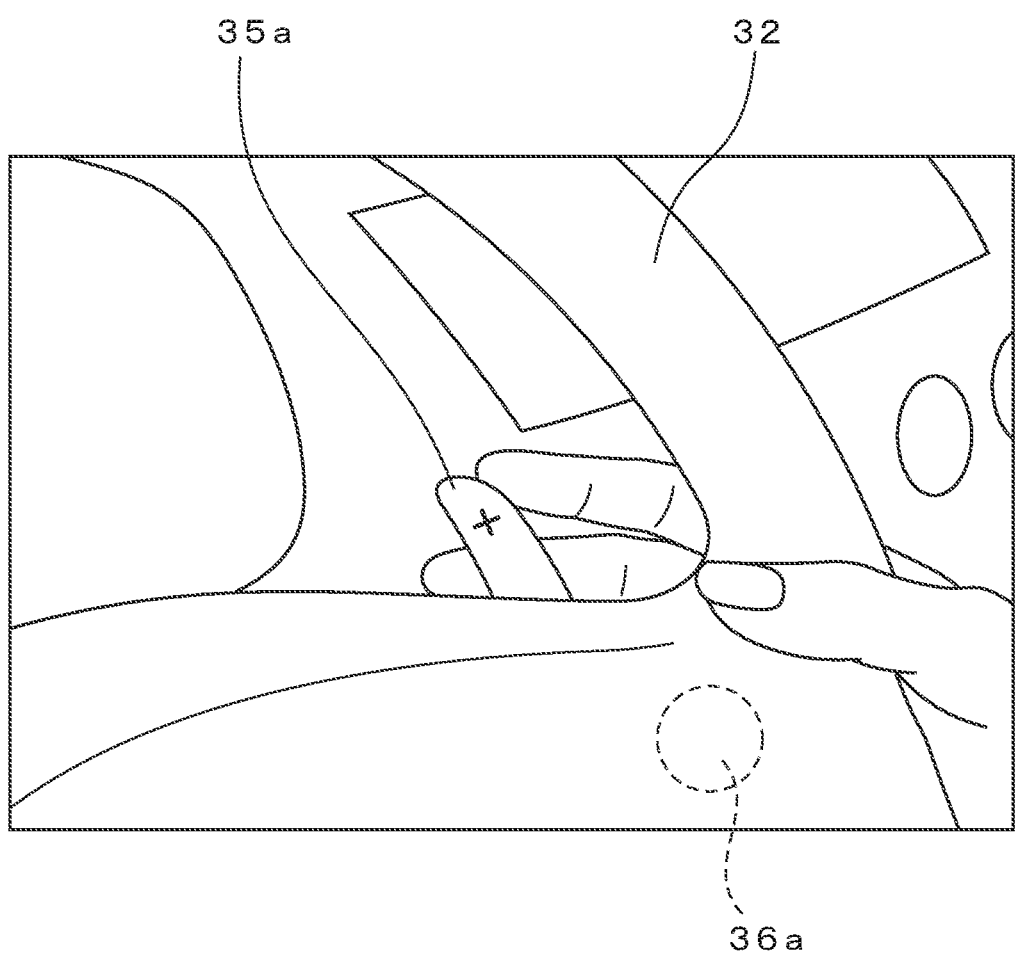
FIG. 2 is a diagram showing a state where the driver is operating a shift operating unit.

As shown in FIG. 2, the shift operating units 35a, 35b can be operated by the hand of the driver 40 that is holding the steering wheel 32, and therefore when the shift detection signal has been input it is estimated that the driver 40 is in control of the steering wheel 32. FIG. 2 is a diagram showing a state where the driver 40 is operating the shift operating unit 35a.

The assessment device 12 notifies the autonomous control device 11 that the control transfer request has been acknowledged. The autonomous control device 11 also switches driving of the vehicle 10 to manual control. The assessment device 12 notifies the driver 40 that the control transfer request has been acknowledged. It is thus recognized that the driver 40 has acknowledged the control transfer request and driving of the vehicle 10 has been switched to manual control.

As explained above, since the assessment device 12 of this embodiment can determine that the driver 40 is in control of the steering wheel when a shift operation signal has been input from shift operating units 35a, 35b, it can be determined that the driver 40 is in control of the steering wheel 32 even if the touch sensor 4 of the steering wheel 32 malfunctions.

Figure 3:
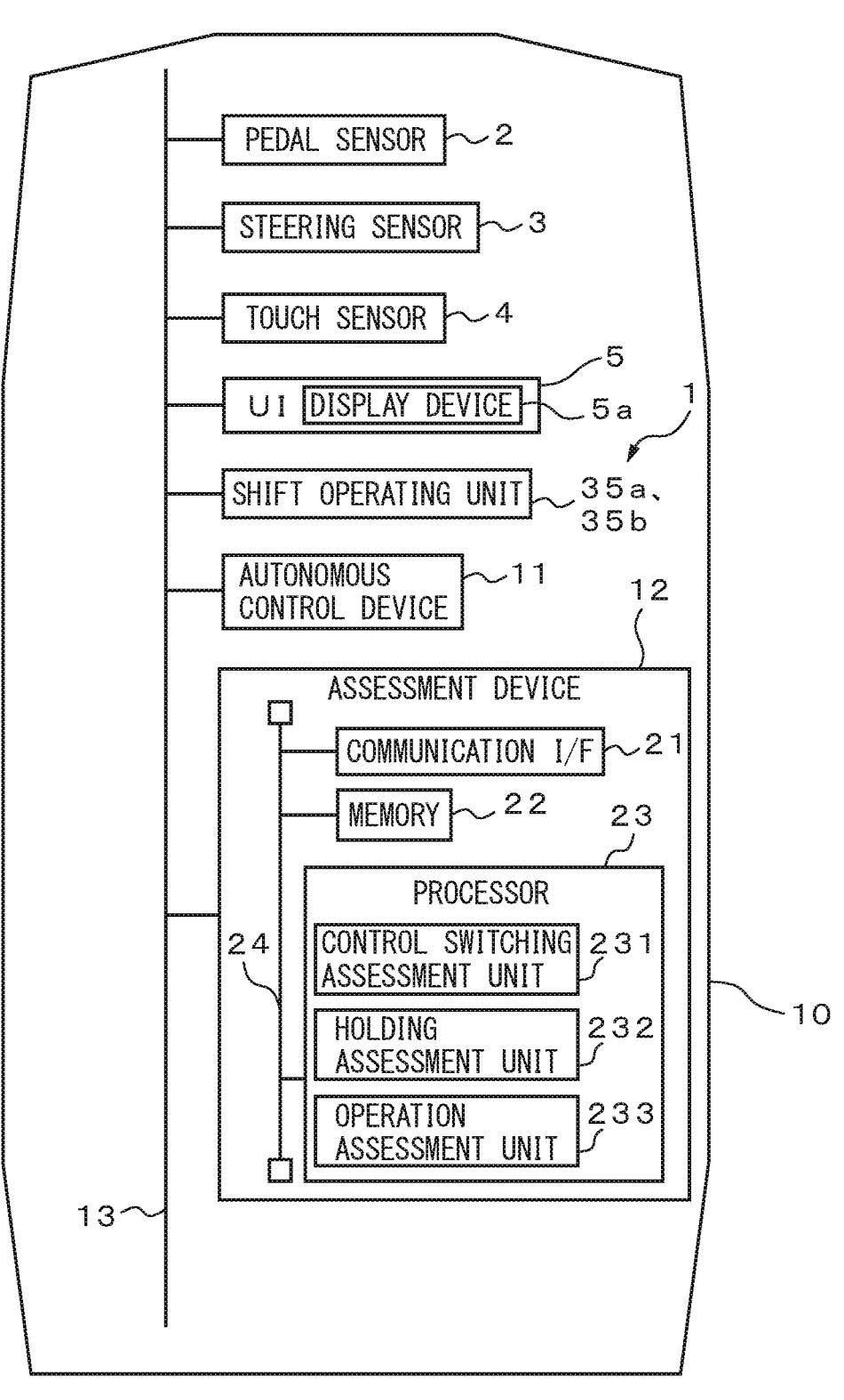
FIG. 3 is a general schematic drawing of a vehicle in which an assessment system is mounted that comprises an assessment device of the embodiment.

FIG. 3 is a general schematic drawing of a vehicle 10 in which an assessment system 1 is mounted that comprises an assessment device 12 of the embodiment. The assessment system 1 has a pedal sensor 2, a steering sensor 3, a touch sensor 4, a user interface (UI) 5, shift operating units 35a, 35b, an autonomous control device 11 and an assessment device 12.

The pedal sensor 2, steering sensor 3, touch sensor 4, UI 5, shift operating units 35a, 35b, autonomous control device 11 and assessment device 12 are connected in a communicable manner via an in-vehicle network 13 that conforms to controller area network standards.

The pedal sensor 2 detects the degree of operation of the brake pedal 33 by the driver 40, generates a brake pedal detection signal corresponding to the degree of operation, and outputs it to the autonomous control device 11 and assessment device 12 via the in-vehicle network 13. The pedal sensor 2 also detects the degree of operation of the accelerator pedal 34 by the driver 40, generates an accelerator pedal detection signal corresponding to the degree of operation, and outputs it to the autonomous control device 11 and assessment device 12 via the in-vehicle network 13.

The steering sensor 3 detects the degree of steering and steering force (torque) on the steering wheel 32 by the driver 40, generates a steering detection signal corresponding to the degree of steering, and outputs it to the autonomous control device 11 and assessment device 12 via the in-vehicle network 13.

The steering wheel 32 has a rim part 321 to be gripped by the driver 40, and a spoke part 322 disposed inside the rim part 321. The touch sensor 4 is situated on the rim part 321 of the steering wheel 32. The touch sensor 4 detects pressure on the rim part 321 when the driver 40 is in control of the steering wheel 32, and outputs the touch detection signal to the autonomous control device 11 and assessment device 12. An electrostatic capacitance sensor, for example may be used as the touch sensor 4.

The UI 5 is an example of the notification unit. The UI 5, controlled by the autonomous control device 11 or assessment device 12, notifies the driver 40 of information relating to the vehicle 10, such as control transfer requests. The UI 5 has a display device 5a such as a liquid crystal display or touch panel, for display of information such as control transfer requests. The UI 5 may also have an acoustic output device (not shown) to notify the driver of control transfer requests. The UI 5 also has a touch panel or operating button, for example, as an input device for inputting operation information from the driver to the vehicle 10. Operation information from the driver to the vehicle 10 may be, for example, a control transfer request for switching of driving of the vehicle 10 from autonomous control to manual control by the driver. The UI 5 outputs the input operation information to the autonomous control device 11 via the in-vehicle network 13.

The shift operating units 35a, 35b can be operated by the hand of the driver 40 that is holding the steering wheel 32. The shift operating units 35a, 35b are operated by the driver 40 and input operation information for changing of the gear ratio of the transmission (not shown) of the vehicle 10. The shift operating units 35a, 35b are situated on the back side of the steering wheel 32 (the side opposite the side facing the driver 40), and rotate together with the steering wheel 32. The shift operating unit 35b is operated by the driver and outputs a gear downshifting operation signal for a change that increases the gear ratio of the transmission, via the in-vehicle network 13, to the assessment device 12 or autonomous control device 11. The shift operating unit 35a is operated by the driver and outputs a gear upshifting operation signal for a change that decreases the gear ratio of the transmission, via the in-vehicle network 13, to the assessment device 12 or autonomous control device 11.

The autonomous control device 11 controls operation of the vehicle 10. The autonomous control device 11 has an autonomous control mode in which the vehicle 10 is driven by autonomous control, and a manual control mode in which operation of the vehicle 10 is controlled based on driver manipulation. The autonomous control device 11 drives the vehicle 10 when in autonomous control mode. In autonomous control mode, the autonomous control device 11 controls operations such as steering, engine actuation and braking based on detection information from sensors (not shown) mounted in the vehicle 10. In manual control mode, the autonomous control device 11 controls operation of the vehicle 10 based on driver manipulation. In manual control mode, the autonomous control device 11 controls operation of the vehicle 10 based on operation of at least one from among the steering wheel 32, brake pedal 33 and accelerator pedal 34 by the driver 40.

The autonomous control device 11 detects other vehicles surrounding the vehicle 10 based on detection information from sensors (not shown) mounted in the vehicle 10. In autonomous control mode, when a spacing of at least a predetermined distance cannot be maintained between the vehicle 10 and another vehicle, the autonomous control device 11 notifies the driver 40 of a control transfer request to switch driving of the vehicle 10 from autonomous control to manual control, via the UI 5. Also in autonomous control mode, when it has been determined that driving of the vehicle 10 cannot be safely controlled due to a sensor malfunction, the autonomous control device 11 notifies the driver 40 of a control transfer request via the UI 5. The autonomous control device 11 also outputs an assessment request for determining whether or not the control transfer request has been acknowledged by the driver 40, to the assessment device 12 via the in-vehicle network 13.

Moreover, when a control transfer request for switching driving of the vehicle 10 from autonomous control to manual control has been made from the driver 40 via the UI 5, the autonomous control device 11 also outputs an assessment request for determining whether or not the control transfer request has been acknowledged by the driver 40, to the assessment device 12 via the in-vehicle network 13.

Upon being notified by the assessment device 12 that a control transfer request has been acknowledged by the driver 40, the autonomous control device 11 switches driving of the vehicle 10 from autonomous control to manual control.

The assessment device 12 carries out control switching assessment processing, holding assessment processing and operation assessment processing. For this purpose, the assessment device 12 has a communication interface (IF) 21, a memory 22 and a processor 23. The communication interface 21, memory 22 and processor 23 are connected via signal wires 24. The communication interface 21 has an interface circuit to connect the assessment device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the assessment device 12 are functional modules driven by a computer program operating on the processor 23, for example. The processor 23 has a control switching assessment unit 231, a holding assessment unit 232 and an operation assessment unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The assessment device 12 is an electronic control unit (ECU), for example. Operation of the assessment device 12 will be described in detail below.

For FIG. 3, the autonomous control device 11 and the assessment device 12 were described as separate devices (for example, the Electronic Control Unit: ECU), but all of the devices may also be constructed as a single device.

Figure 4:
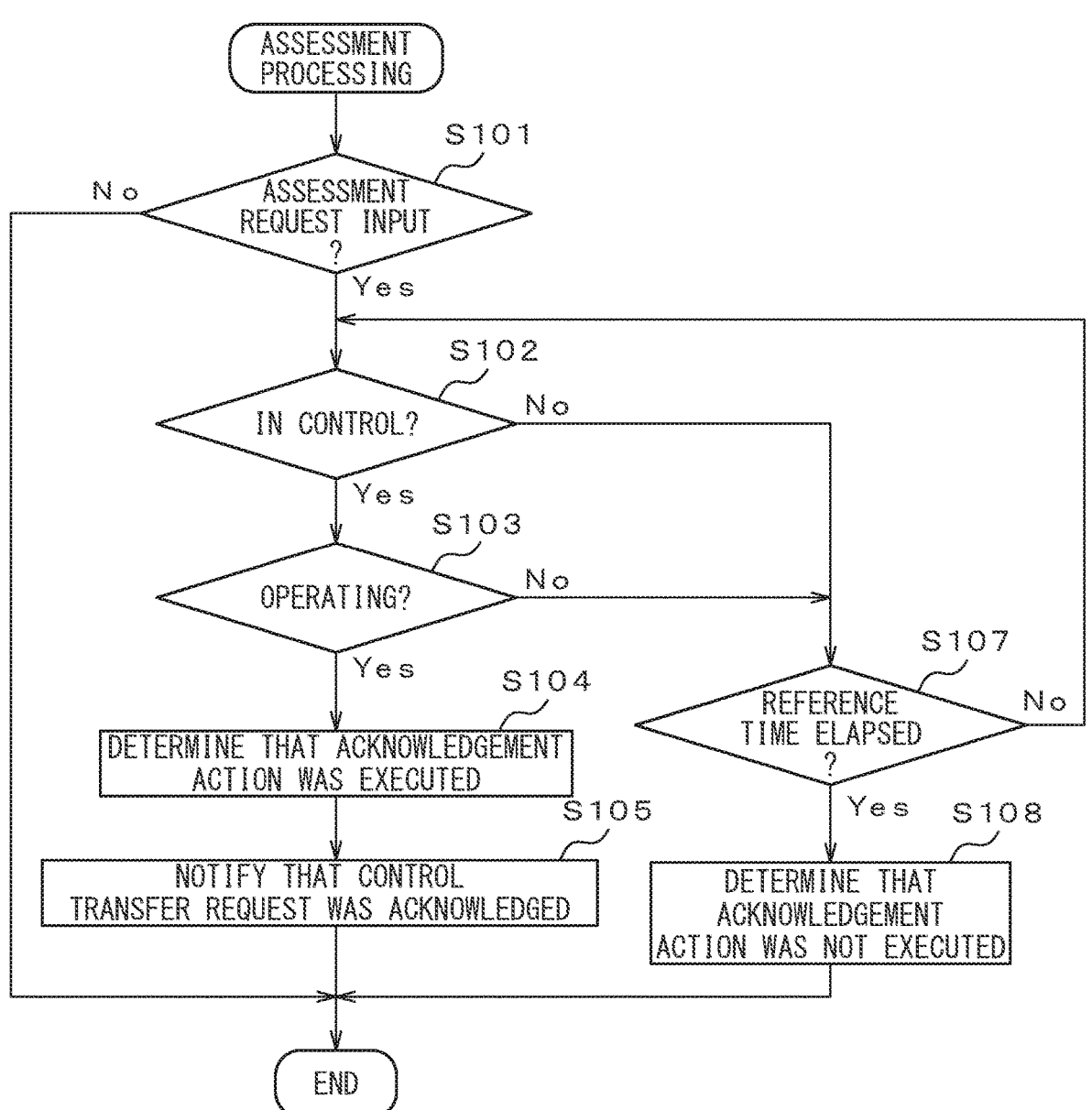
FIG. 4 is an example of an operation flow chart for assessment processing of an assessment device according to the embodiment.

FIG. 4 is an example of an operation flow chart for assessment processing of the assessment device 12 according to the embodiment. Assessment processing by the assessment system 1 will be described below with reference to FIG. 4. The assessment processing illustrated in FIG. 4 is carried out at different assessment times in a predetermined cycle.

First, the control switching assessment unit 231 determines whether or not an assessment request has been input (step S101). When an assessment request has been input from the autonomous control device 11 via the in-vehicle network 13, the control switching assessment unit 231 determines that an assessment request has been input (step S101—Yes).

The holding assessment unit 232 then determines whether or not the driver 40 is in control of the steering wheel 32 (step S102). Holding assessment processing by the holding assessment unit 232 will be described below with reference to FIG. 5.

When the driver 40 is in control of the steering wheel 32 (step S102—Yes), the operation assessment unit 233 determines whether or not the driver 40 is operating the brake pedal 33, accelerator pedal 34 or steering 32. When at least one signal from among the brake pedal detection signal, accelerator pedal detection signal and steering detection signal has been input within a predetermined period, the operation assessment unit 233 determines that the driver 40 is operating at least one from among the brake pedal 33, accelerator pedal 34 and steering 32 (step S103—Yes). The predetermined period may be 1 second, for example. On the other hand, when no signal from among the brake pedal detection signal, accelerator pedal detection signal and steering detection signal has been input within the predetermined period, the operation assessment unit 233 determines that the driver 40 is not operating any from among the brake pedal 33, accelerator pedal 34 and steering 32 (step S103—No).

When the driver 40 is operating the brake pedal 33, accelerator pedal 34 or steering 32, the control switching assessment unit 231 determines that the driver 40 has executed an acknowledgement action (step S104).

The control switching assessment unit 231 then notifies the autonomous control device 11 of acknowledgement information indicating that the driver 40 has acknowledged the control transfer request (step S105), and the series of processing steps is complete. The autonomous control device 11 switches driving of the vehicle 10 to manual control. The autonomous control device 11 also notifies the driver 40 of switching driving of the vehicle 10 to manual control, via the UI 5. It is thus recognized that the driver 40 has acknowledged the control transfer request and driving of the vehicle 10 has been switched to manual control.

When an assessment request has not been input from the autonomous control device 11 (step S101—No), on the other hand, the series of processing steps is complete.

When the driver 40 is not in control of the steering wheel 32 (step S102—No) or the driver 40 is not operating the brake pedal 33, accelerator pedal 34 or steering 32 (step S103—No), the control switching assessment unit 231 determines whether or not a reference time has elapsed from the point at which the assessment request was input (step S107). The reference time may be 5 seconds, for example.

When the reference time has elapsed (step S107—Yes), the control switching assessment unit 231 determines that the driver 40 has not executed an acknowledgement action (step S106), and the series of processing steps is complete.

When there has been no notification of acknowledgement information even after elapse of a predetermined period, the autonomous control device 11 notifies the driver 40 of information indicating that the control transfer request has not been acknowledged by the driver 40, via the UI 5. The autonomous control device 11 continues driving the vehicle 10 by autonomous control while again notifying the driver 40 of a control transfer request to switch driving of the vehicle 10 from autonomous control to manual control, via the UI 5. The autonomous control device 11 also outputs an assessment request for determining whether or not the control transfer request has been acknowledged by the driver 40, to the assessment device 12 via the in-vehicle network 13. The autonomous control device 11 may generate a control transfer request and stop the vehicle 10 when lack of notification of acknowledgement information has been repeated a predetermined number of times.

When the reference time has not elapsed (step S107—No), on the other hand, processing returns to the start of step S102.

Figures 5, 6:
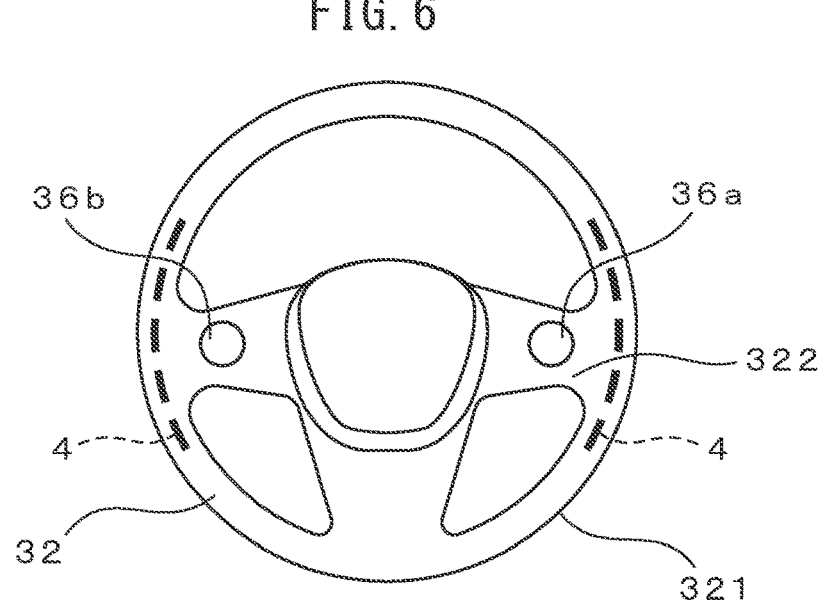
FIG. 5 is an example of an operation flow chart for holding assessment processing by an assessment device according to the embodiment.
FIG. 6 is a diagram showing another form of an operating unit situated in a steering wheel.

Holding assessment processing by the holding assessment unit 232 will be described below with reference to FIG. 5. FIG. 5 is an example of an operation flow chart for holding assessment processing of an assessment device of the embodiment.

First, the holding assessment unit 232 determines whether or not a touch detection signal has been input through the touch sensor 4 (step S201).

When a touch detection signal has been input through the touch sensor 4 (step S201—Yes), the holding assessment unit 232 determines that the driver 40 is in control of the steering wheel 32 (step S203), and the series of processing steps is complete.

When a touch detection signal has not been input through the touch sensor 4 (step S201—No), on the other hand, the holding assessment unit 232 determines whether or not an operation signal has been input through the shift operating units 35*a*, 35*b* (step S202).

When an operation signal has been input through the shift operating units 35*a*, 35*b* (step S202—Yes), the holding assessment unit 232 determines that the driver 40 is in control of the steering wheel 32, and the series of processing steps is complete (step S203).

When an operation signal has not been input through the shift operating units 35*a*, 35*b* (step S202—No), on the other hand, the holding assessment unit 232 determines that the driver 40 is not in control of the steering wheel 32 (step S203), and the series of processing steps is complete.

In the example shown in FIG. 1C, the holding assessment unit 232 may also determine that the driver 40 is in control of the steering wheel when a gear upshifting operation signal has been input through the shift operating unit 35*a* and a gear downshifting operation signal has been input through the shift operating unit 35*b*.

The holding assessment unit 232 may also determine that the driver 40 is in control of the steering wheel when either a gear upshifting operation signal has been input through the shift operating unit 35*a* or a gear downshifting operation signal has been input through the shift operating unit 35*b*.

As shown in FIG. 2, the shift operating units 35*a*, 35*b* can be operated by the hand of the driver 40 that is holding the steering wheel 32, and therefore when the shift detection signal has been input it is estimated that the driver 40 is in control of the steering wheel 32.

For example, when the driver 40 is in control of the steering wheel 32 with both hands and the shift operating unit 35*a* is being operated with the right hand, the force of holding the steering wheel 32 by the right hand will usually be weaker than the force of holding the steering wheel 32 by the left hand which is not operating the shift operating unit 35*b*. For the purpose of the present specification, such a state of the right hand is also included in the concept of the driver being in control of the steering wheel 32 with the right hand. This also applies to cases where the driver 40 is in control of the steering wheel 32 with both hands and the shift operating unit 35*b* is being operated by the left hand.

The driver 40 knows that operation of the shift operating units 35*a*, 35*b* is included as being in control of the steering wheel 32, as an acknowledgement action. In this case, step S201 may be omitted, and it may be determined whether or not the driver 40 is in control of the steering wheel 32 in step S202. When the touch sensor 4 has malfunctioned so that a touch detection signal is not generated in the processing including step S201 described above, the holding assessment unit 232 can determine in step S202 that the driver 40 is in control of the steering wheel 32 if the shift operating units 35*a*, 35*b* are already being operated by a hand of the driver 40 that is holding the steering wheel 32.

Furthermore, since the touch sensor 4 has malfunctioned so that a touch detection signal is not generated, if the reference time has elapsed (step S107—Yes), the autonomous control device 11 notifies the driver 40 via the UI 5 of information indicating that the control transfer request has not been acknowledged by the driver 40. For the next assessment processing, if the driver 40 operates the shift operating units 35*a*, 35*b* by a hand that is holding the steering wheel 32, then the holding assessment unit 232 can determine that the driver 40 is in control of the steering wheel 32.

As explained above, since the assessment device of this embodiment can determine that the driver is in control of the steering wheel when a shift operation signal has been input from an operating unit, it can be determined that the driver is in control of the steering wheel even if the touch sensor of the steering wheel malfunctions.

This makes it possible to input to the assessment device that the control transfer request has been acknowledged by operation of the shift operating unit by the driver, even when the touch sensor has malfunctioned such that no touch detection signal is input to the assessment device even though the driver is in control of the steering wheel.

The assessment device, computer program for assessment and assessment method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

For example, the operating units that can be operated by a hand of the driver that is holding the steering wheel are not limited to shift operating units. FIG. 6 is a diagram showing another form of an operating unit situated in a steering wheel.

In the example shown in FIG. 6, the operating units 36*a*, 36*b* that can be operated by the hand of the driver that is holding the steering wheel are situated on the spoke part 322. The operating units 36*a*, 36*b* are operated by the driver 40 and input operation information for operation of a display device 5*a* or audio device (not shown). When the operating units 36*a*, 36*b* are operated by the driver 40, an operation signal is output to the assessment device 12 via the in-vehicle network 13. As shown in FIG. 2, the operating units 36*a*, 36*b* can be operated by a hand of the driver 40 that is holding the steering wheel 32, and therefore when the operation signal has been input it is estimated that the driver 40 is in control of the steering wheel 32.

For the purpose of the disclosure, the operating units are preferably situated on or around the steering wheel so that operation is difficult when the driver is not in manual control of the steering wheel. In particular, the operating units are preferably situated on or around the steering wheel so that operation is impossible if the driver is not in manual control of the steering wheel.

For the embodiments described above, the operation signal from an operating unit was used to determine whether or not the driver has executed an acknowledgement action when the autonomous control device switches driving of the vehicle from autonomous control to manual control. However, the operation signal from the operating unit may also be used for other purposes, so long as it is used to determine whether the driver is in manual control of the steering wheel.

The invention claimed is:

1. An assessment method carried out by an assessment device, the method comprising:

determining that a touch detection signal has not been received from a touch sensor, the touch sensor being configured to detect a touch of a driver, in response to determining that the touch detection signal has not been received from the touch sensor, determining whether the driver is in control of the steering wheel based on whether an operation signal has been input from an operating unit, different from the touch sensor, that is configured to (i) be operated by a hand of the driver that is holding the steering wheel and (ii) output the operation signal for operating a display device or an audio device of the vehicle, and based on the determination of whether the driver is in control of the steering wheel, notifying an autonomous control device by transmitting acknowledgement information to the autonomous control device, configured to control operations of a vehicle the driver is in, to control the vehicle to switch from an autonomous control mode in which the vehicle is driving by autonomous control to a manual control mode, wherein the autonomous control device, in response to receiving the acknowledgement information, switches the vehicle from the autonomous control mode to the manual control mode in which the vehicle is driving based on manipulation by the driver, wherein determining that the touch detection signal has not been received from the touch sensor indicates that the touch sensor has failed.

2. A computer-readable, non-transitory storage medium storing a computer program for assessment, wherein the computer program causes a processor to execute a process, the process comprising:

determining whether a touch detection signal has been received from a touch sensor, the touch sensor being configured to detect a touch of a driver, in response to determining that the touch detection signal has been received from the touch sensor, determining whether the driver is in control of a steering wheel based on the touch detection signal, in response to determining that the touch detection signal has not been received from the touch sensor, determining whether the driver is in control of the steering wheel based on whether an operation signal has been input from an operating unit, different from the touch sensor, that is configured to (i) be operated by a hand of the driver that is holding the steering wheel and (ii) output the operation signal for operating a display device or an audio device of the vehicle, and based on the determination of whether the driver is in control of the steering wheel, notifying an autonomous control device by transmitting acknowledgement information to the autonomous control device, configured to control operations of a vehicle the driver is in, to control the vehicle to switch from an autonomous control mode in which the vehicle is driving by autonomous control to a manual control mode, wherein the autonomous control device, in response to receiving the acknowledgement information, switches the vehicle from the autonomous control mode to the manual control mode in which the vehicle is driving based on manipulation by the driver, wherein determining that the touch detection signal has not been received from the touch sensor indicates that the touch sensor has failed.

3. An assessment device comprising:

a processor configured to:

determine whether a touch detection signal has been received from a touch sensor, the touch sensor being configured to detect a touch of a driver, in response to determining that the touch detection signal has been received from the touch sensor, determining whether the driver is in control of a steering wheel based on the touch detection signal, in response to determining that the touch detection signal has not been received from the touch sensor, determine whether the driver is in control of the steering wheel based on whether an operation signal has been input from an operating unit, different from the touch sensor, that is configured to (i) be operated by a hand of the driver that is holding the steering wheel and (ii) output the operation signal for operating a display device or an audio device of the vehicle, and based on the determination of whether the driver is in control of the steering wheel, notify an autonomous control device by transmitting acknowledgement information to the autonomous control device, configured to control operations of a vehicle the driver is in, to control the vehicle to switch from an autonomous control mode in which the vehicle is driving by autonomous control to a manual control mode, wherein the autonomous control device, in response to receiving the acknowledgement information, switches the vehicle from the autonomous control mode to the manual control mode in which the vehicle is driving based on manipulation by the driver, wherein determining that the touch detection signal has not been received from the touch sensor indicates that the touch sensor has failed.

4. The assessment device according to claim 3, wherein the operating unit is operated by the driver and inputs operation information to change the gear ratio of the transmission.

5. The assessment device according to claim 4, wherein the operating unit has a first shift operating unit that is operated by the driver and outputs a first operation signal for a change that increases the gear ratio of the transmission, and a second shift operating unit that is operated by the driver and outputs a second operation signal for a change that decreases the gear ratio of the transmission, and the processor is further configured to determine that the driver is in control of the steering wheel when the first operation signal has been input from the first shift operating unit and the second operation signal has been input from the second shift operating unit.

6. The assessment device according to claim 3, wherein when no touch detection signal is received from the touch sensor, the processor determines that the touch sensor has malfunctioned, the malfunction preventing generation of the touch detection signal, and in response, performs the determination of whether the driver is in control of the steering wheel based on whether the operation signal from the operating unit has been input.

7. The assessment device according to claim 3, wherein the operating unit is situated (i) on the steering wheel and configured to rotate together with the steering wheel or (ii) on a spoke part of the steering wheel.

8. The assessment device according to claim 3, wherein, in response to determining that the touch detection signal has been received from the touch sensor, the processor determines that the driver is in control of the steering wheel based only on the touch detection signal, without determining whether the operation signal from the operating unit has been input.

\* \* \* \* \*